(12) United States Patent
Braganza et al.

(10) Patent No.: US 8,813,843 B2
(45) Date of Patent: Aug. 26, 2014

(54) HYDROPHOBICALLY MODIFIED POLYMER FOR THERMALLY STABILIZING FRACTURING FLUIDS

(75) Inventors: Giselle K. Braganza, Pune (IN); Achala V. Danait, Pune (IN)

(73) Assignee: Halliburton Energy Services, Inc., Houston, TX (US)

( * ) Notice: Subject to any disclaimer, the term of this patent is extended or adjusted under 35 U.S.C. 154(b) by 180 days.

(21) Appl. No.: 13/278,806

(22) Filed: Oct. 21, 2011

(65) Prior Publication Data

US 2013/0098618 A1    Apr. 25, 2013

(51) Int. Cl.
*E21B 43/22*    (2006.01)
*C09K 8/68*    (2006.01)

(52) U.S. Cl.
CPC ..................................... *C09K 8/685* (2013.01)
USPC ...... 166/300; 166/279; 166/305.1; 166/308.5

(58) Field of Classification Search
None
See application file for complete search history.

(56) References Cited

U.S. PATENT DOCUMENTS

| | | |
|---|---|---|
| 4,460,751 A | 7/1984 | Hanlon |
| 4,797,216 A | 1/1989 | Hodge |
| 6,476,169 B1 | 11/2002 | Eoff |
| 7,563,750 B2 | 7/2009 | Eoff et al. |
| 7,759,292 B2 | 7/2010 | Eoff et al. |
| 2004/0209780 A1 | 10/2004 | Harris et al. |
| 2004/0229756 A1 | 11/2004 | Eoff et al. |
| 2008/0234147 A1* | 9/2008 | Li et al. .......................... 507/215 |
| 2009/0145607 A1 | 6/2009 | Li |
| 2009/0203555 A1 | 8/2009 | Milne |
| 2011/0256085 A1 | 10/2011 | Talingting Pabalan et al. |
| 2012/0004148 A1* | 1/2012 | Ogle et al. .................... 507/213 |

OTHER PUBLICATIONS

International Search Report for PCT/US2012/059913 issued Jan. 18, 2013.
International Search Report for PCT/US2012/059913 issued Jan. 28, 2013.

* cited by examiner

*Primary Examiner* — Zakiya W Bates
(74) *Attorney, Agent, or Firm* — Craig Roddy; Booth Albanesi Schroeder, LLC

(57) ABSTRACT

A method for treating a zone of subterranean formation is provided. The method includes the steps of: (a) forming a treatment fluid including: (i) water; (ii) a viscosity-increasing agent selected from the group consisting of water-soluble polysaccharides, water-soluble derivatives thereof, and any combination of the foregoing; (iii) a crosslinker for the viscosity-increasing agent; (iv) a hydrophobically modified water-soluble polymer; wherein the viscosity-increasing agent is not a hydrophobically modified polymer; and (b) introducing the treatment fluid into a zone of a subterranean formation, wherein the zone has a design temperature of equal to or greater than 350° F.

22 Claims, 2 Drawing Sheets

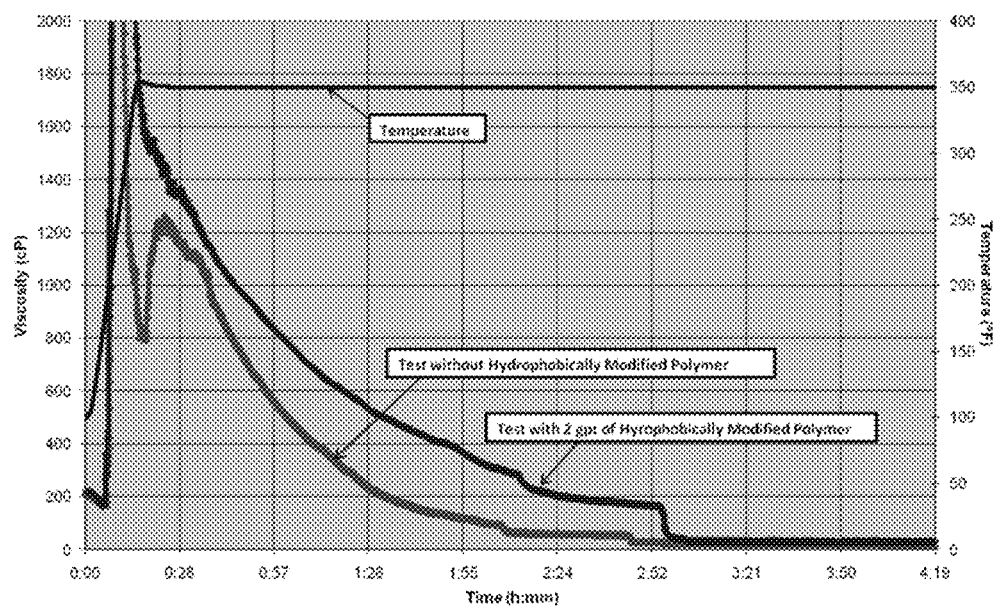

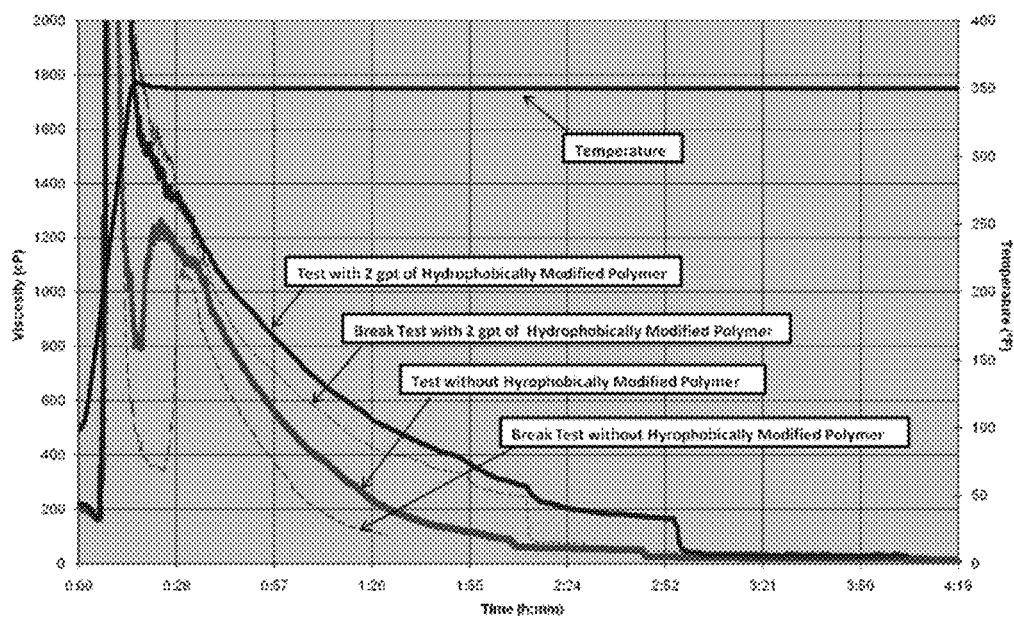

HYDROPHOBICALLY MODIFIED POLYMER FOR THERMALLY STABILIZING FRACTURING FLUIDS

BACKGROUND

1. Technical Field

The inventions are in the field of producing crude oil or natural gas. More specifically, the inventions generally relate to methods and compositions for treating a subterranean formation. For example, the methods and compositions can be useful for fracturing a zone of a subterranean formation.

2. Background Art

Oil & Gas Reservoirs

In the context of production from a well, oil and gas are understood to refer to crude oil and natural gas. These substances are of hydrocarbons that naturally occur in certain subterranean formations.

A subterranean formation is a body of rock that has sufficiently distinctive characteristics and is sufficiently continuous for geologists to describe, map, and name it. A subterranean formation containing oil or gas is sometimes referred to as a reservoir. A reservoir is a subsurface rock body in which oil or gas is present. A reservoir may be located under land or under the seabed off shore. Oil and gas reservoirs are typically located in the range of a few hundred feet (shallow reservoirs) to a few tens of thousands of feet (ultra-deep reservoirs) below the surface of the land or seabed.

Well for Producing Oil and Gas

To produce oil or gas from a reservoir, a well is drilled into a subterranean formation, which may be the reservoir or adjacent to the reservoir. A well includes a wellhead and at least one wellbore from the wellhead penetrating the earth. Typically, a wellbore must be drilled thousands of feet into the earth to reach a hydrocarbon-bearing formation.

The greater the depth of the formation, the higher the "static" pressure and temperature of the formation. Initially, the static pressure equals the initial pressure in the formation before production. After production begins, the static pressure approaches the average reservoir pressure. Usually, the greater the depth of a formation, the higher the natural temperature of the formation.

The wellbore refers to the drilled hole, including any cased or uncased portions of the well. The borehole usually refers to the inside wellbore wall, that is, the rock face or wall that bounds the drilled hole. A wellbore can have portions that are vertical, horizontal, or anything in between, and it can have portions that are straight, curved, or branched. The wellhead is the surface termination of a wellbore, which surface may be on land or on a seabed. As used herein, "uphole," "downhole," and similar terms are relative to the direction of the wellhead, regardless of whether a wellbore portion is vertical or horizontal.

A wellbore can be used as a production wellbore to produce hydrocarbons from the reservoir. A wellbore can be used as an injector well to inject a fluid, e.g., water or gas, to drive the relevant fluids/gasses to a production wellbore.

Broadly, a zone refers to an interval of rock along a wellbore that is differentiated from surrounding rocks based on hydrocarbon content or other features, such as permeability, composition, perforations or other fluid communication with the wellbore, faults, or fractures. A zone of a wellbore that penetrates a hydrocarbon-bearing zone that is capable of producing hydrocarbon is referred to as a production zone.

Generally, well services include a wide variety of operations that may be performed in wells, such as drilling, cementing, completion, and intervention. These well services are designed to facilitate or enhance the production of desirable fluids from or through a subterranean formation.

Well Fluids

As used herein, a "well fluid" broadly refers to any fluid adapted to be introduced into a well for any purpose. A well fluid can be, for example, a drilling fluid, a cementing fluid, a treatment fluid, or a spacer fluid. If a well fluid is to be used in a relatively small volume, for example less than about 200 barrels, it is sometimes referred to in the art as a wash, dump, slug, or pill.

As used herein, "into a well" means introduced at least into and through the wellhead. According to various techniques known in the art, equipment, tools, or well fluids can be directed from the wellhead into any desired portion of the wellbore. Additionally, a well fluid can be directed from a portion of the wellbore into the rock matrix of a zone.

Often, the step of delivering a well fluid into a well is within a relatively short period after forming the well fluid, e.g., within one hour. More preferably, the step of delivering the well fluid is immediately after the step of forming the well fluid, which is "on the fly." It should be understood that the step of delivering the treatment fluid into the wellbore can include the use of one or more fluid pumps.

Well Treatments and Treatment Fluids

Drilling, completion, and intervention operations can include various types of treatments that are commonly performed in a wellbore or subterranean formation. For example, a treatment for fluid-loss control can be used during any of drilling, completion, and intervention operations. During completion or intervention, stimulation is a type of treatment performed to enhance or restore the productivity of oil and gas from a well. Stimulation treatments fall into two main groups: hydraulic fracturing and matrix treatments. Fracturing treatments are performed above the fracture pressure of the subterranean formation to create or extend a highly permeable flow path between the formation and the wellbore. Matrix treatments are performed below the fracture pressure of the formation. Other types of completion or intervention treatments can include, for example, gravel packing, consolidation, and controlling excessive water production.

As used herein, the word "treatment" refers to any treatment for changing a condition of a wellbore or an adjacent subterranean formation. Examples of treatments include fluid-loss control, isolation, stimulation, or conformance control; however, the word "treatment" does not necessarily imply any particular treatment purpose.

A treatment usually involves introducing a treatment fluid into a well. As used herein, a "treatment fluid" is a fluid used in a treatment. Unless the context otherwise requires, the word "treatment" in the term "treatment fluid" does not necessarily imply any particular treatment or action by the fluid. If a treatment fluid is to be used in a relatively small volume, for example less than about 200 barrels, it is sometimes referred to in the art as a wash, dump, slug, or pill.

As used herein, a "treatment zone" refers to an interval of rock along a wellbore into which a treatment fluid is directed to flow from the wellbore. Further, as used herein, "into a treatment zone" means into and through the wellhead and, additionally, through the wellbore and into the treatment zone.

Well Treatment—Hydraulic Fracturing

Hydraulic fracturing, sometimes referred to as fracturing or fraccing, is a common stimulation treatment. The purpose of a fracturing treatment is to provide an improved flow path for oil or gas to flow from the hydrocarbon-bearing formation to the wellbore. A treatment fluid adapted for this purpose is sometimes referred to as a fracturing fluid. The fracturing fluid is pumped at a sufficiently high flow rate and pressure into the wellbore and into the subterranean formation to create or enhance a fracture in the subterranean formation. Creating a fracture means making a new fracture in the formation. Enhancing a fracture means enlarging a pre-existing fracture in the formation.

A frac pump is used for hydraulic fracturing. A frac pump is a high-pressure, high-volume pump. Typically, a frac pump is a positive-displacement reciprocating pump. The structure of such a pump is resistant to the effects of pumping abrasive fluids, and the pump is constructed of materials that are resistant to the effects of pumping corrosive fluids. Abrasive fluids are suspensions of hard, solid particulates, such as sand. Corrosive fluids include, for example, acids. The fracturing fluid may be pumped down into the wellbore at high rates and pressures, for example, at a flow rate in excess of 50 barrels per minute (2,100 U.S. gallons per minute) at a pressure in excess of 5,000 pounds per square inch ("psi"). The pump rate and pressure of the fracturing fluid may be even higher, for example, flow rates in excess of 100 barrels per minute and pressures in excess of 10,000 psi are common.

Fracturing a subterranean formation often uses hundreds of thousands of gallons of fracturing fluid or more. Further, it is often desirable to fracture more than one treatment zone of a well. Thus, a high volume of fracturing fluids is often used in fracturing of a well, which means that a low-cost fracturing fluid is desirable. Because of the ready availability and relative low cost of water compared to other liquids, among other considerations, a fracturing fluid is usually water-based.

The creation or extension of a major fracture in hydraulic fracturing of a conventional formation tends to occur suddenly. When this happens, the fracturing fluid suddenly has a fluid flow path through the fracture to flow more rapidly away from the wellbore, which may be detected as a change in pressure or fluid flow rate. It can also be detected with seismic techniques.

Proppant for Hydraulic Fracturing

A newly-created or newly-extended fracture will tend to close together after the pumping of the fracturing fluid is stopped. To prevent the fracture from closing, a material is usually placed in the fracture to keep the fracture propped open and to provide higher fluid conductivity than the matrix of the formation. A material used for this purpose is referred to as a proppant.

A proppant is in the form of a solid particulate, which can be suspended in the fracturing fluid, carried downhole, and deposited in the fracture to form a proppant pack. The proppant pack props the fracture in an open condition while allowing fluid flow through the permeability of the pack. The proppant pack in the fracture provides a higher-permeability flow path for the oil or gas to reach the wellbore compared to the permeability of the matrix of the surrounding subterranean formation. This higher-permeability flow path increases oil and gas production from the subterranean formation.

A particulate for use as a proppant is usually selected based on the characteristics of size range, crush strength, and solid stability in the types of fluids that are encountered or used in wells. Preferably, a proppant should not melt, dissolve, or otherwise degrade from the solid state under the downhole conditions.

The proppant is selected to be an appropriate size to prop open the fracture and bridge the fracture width expected to be created by the fracturing conditions and the fracturing fluid. If the proppant is too large, it will not easily pass into a fracture and will screenout too early. If the proppant is too small, it will not provide the fluid conductivity to enhance production. See, for example, McGuire and Sikora, 1960. In the case of fracturing relatively permeable or even tight-gas reservoirs, a proppant pack should provide higher permeability than the matrix of the formation. In the case of fracturing ultra-low permeable formations, such as shale formations, a proppant pack should provide for higher permeability than the naturally occurring fractures or other micro-fractures of the fracture complexity.

Appropriate sizes of particulate for use as a proppant are typically in the range from about 8 to about 100 U.S. Standard Mesh. A typical proppant is sand-sized, which geologically is defined as having a largest dimension ranging from about 0.06 millimeters up to about 2 millimeters (mm). (The next smaller particle size class below sand sized is silt, which is defined as having a largest dimension ranging from less than about 0.06 mm down to about 0.004 mm.) As used herein, proppant does not mean or refer to suspended solids, silt, fines, or other types of insoluble solid particulate smaller than about 0.06 mm (about 230 U.S. Standard Mesh). Further, it does not mean or refer to particulates larger than about 3 mm (about 7 U.S. Standard Mesh).

The proppant is sufficiently strong, that is, has a sufficient compressive or crush resistance, to prop the fracture open without being deformed or crushed by the closure stress of the fracture in the subterranean formation. For example, for a proppant material that crushes under closure stress, a 20/40 mesh proppant preferably has an API crush strength of at least 4,000 psi closure stress based on 10% crush fines according to procedure API RP-56. A 12/20 mesh proppant material preferably has an API crush strength of at least 4,000 psi closure stress based on 16% crush fines according to procedure API RP-56. This performance is that of a medium crush-strength proppant, whereas a very high crush-strength proppant would have a crush-strength of about 10,000 psi. In comparison, for example, a 100-mesh proppant material for use in an ultra-low permeable formation such as shale preferably has an API crush strength of at least 5,000 psi closure stress based on 6% crush fines. The higher the closing pressure of the formation of the fracturing application, the higher the strength of proppant is needed. The closure stress depends on a number of factors known in the art, including the depth of the formation.

Further, a suitable proppant should be stable over time and not dissolve in fluids commonly encountered in a well environment. Preferably, a proppant material is selected that will not dissolve in water or crude oil.

Suitable proppant materials include, but are not limited to, sand (silica), ground nut shells or fruit pits, sintered bauxite, glass, plastics, ceramic materials, processed wood, resin coated sand or ground nut shells or fruit pits or other composites, and any combination of the foregoing. Mixtures of different kinds or sizes of proppant can be used as well. In conventional reservoirs, if sand is used, it commonly has a median size anywhere within the range of about 20 to about 100 U.S. Standard Mesh. For a synthetic proppant, it commonly has a median size anywhere within the range of about 8 to about 100 U.S. Standard Mesh.

Increasing Viscosity of Fluid for Suspending Particulate

Various particulates can be employed in a fluid for use in a well or a fluid can be used to help remove particulates from a well.

For example, a proppant used in fracturing or a gravel used in gravel packing may have a much different density than the carrier fluid. For example, sand has a specific gravity of about 2.7, whereas water has a specific gravity of 1.0 at Standard Laboratory conditions of temperature and pressure. A proppant or gravel having a different density than water will tend to separate from water very rapidly.

As many well fluids are water-based, partly for the purpose of helping to suspend particulate of higher density, and for other reasons known in the art, the density of the fluid used in a well can be increased by including highly water-soluble salts in the water, such as potassium chloride. However, increasing the density of a well fluid will rarely be sufficient to match the density of the particulate.

Increasing the viscosity of a well fluid can help prevent a particulate having a different specific gravity than an external phase of the fluid from quickly separating out of the external phase.

Viscosity-Increasing Agent

A viscosity-increasing agent can be used to increase the ability of a fluid to suspend and carry a particulate material in a well fluid. A viscosity-increasing agent can be used for other purposes, such as matrix diversion or conformance control.

A viscosity-increasing agent is sometimes referred to in the art as a viscosifying agent, viscosifier, thickener, gelling agent, or suspending agent. In general, any of these refers to an agent that includes at least the characteristic of increasing the viscosity of a fluid in which it is dispersed or dissolved. There are several kinds of viscosity-increasing agents and related techniques for increasing the viscosity of a fluid.

In general, because of the high volume of fracturing fluid typically used in a fracturing operation, it is desirable to efficiently increase the viscosity of fracturing fluids to the desired viscosity using as little viscosity-increasing agent as possible. In addition, relatively inexpensive materials are preferred. Being able to use only a small concentration of the viscosity-increasing agent requires a lesser amount of the viscosity-increasing agent in order to achieve the desired fluid viscosity in a large volume of fracturing fluid.

Polymers for Increasing Viscosity

Certain kinds of polymers can be used to increase the viscosity of a fluid. In general, the purpose of using a polymer is to increase the ability of the fluid to suspend and carry a particulate material. Polymers for increasing the viscosity of a fluid are preferably soluble in the external phase of a fluid. Polymers for increasing the viscosity of a fluid can be naturally occurring polymers such as polysaccharides, derivatives of naturally occurring polymers, or synthetic polymers.

Water-Soluble Polysaccharides or Derivatives for Increasing Viscosity

Fracturing fluids are usually water-based. Efficient and inexpensive viscosity-increasing agents for water include certain classes of water-soluble polymers.

The water-soluble polymer can have an average molecular weight in the range of from about 50,000 to 20,000,000, most preferably from about 100,000 to about 4,000,000. For example, guar polymer is believed to have a molecular weight in the range of about 2 to about 4 million.

Typical water-soluble polymers used in well treatments are water-soluble polysaccharides (e.g., guar) and water-soluble synthetic polymers (e.g., polyacrylamide). The most common water-soluble polysaccharides employed in well treatments are guar and its derivatives.

As used herein, a "polysaccharide" can broadly include a modified or derivative polysaccharide. As used herein, "modified" or "derivative" means a compound or substance formed by a chemical process from a parent compound or substance, wherein the chemical skeleton of the parent is retained in the derivative. The chemical process preferably includes at most a few chemical reaction steps, and more preferably only one or two chemical reaction steps. As used herein, a "chemical reaction step" is a chemical reaction between two chemical reactant species to produce at least one chemically different species from the reactants (regardless of the number of transient chemical species that may be formed during the reaction). An example of a chemical step is a substitution reaction. Substitution on a polymeric material may be partial or complete.

A guar derivative can be selected from the group consisting of, for example, a carboxyalkyl derivative of guar, a hydroxyalkyl derivative of guar, and any combination thereof. Preferably, the guar derivative is selected from the group consisting of carboxymethylguar, carboxymethylhydroxyethylguar, hydroxyethylguar, carboxymethylhydroxypropylguar, ethylcarboxymethylguar, and hydroxypropylmethylguar.

A cellulose derivative can be selected from the group consisting of, for example, a carboxyalkyl derivative of cellulose, a hydroxyalkyl derivative of cellulose, and any combination thereof. Preferably, the cellulose derivative is selected from the group consisting of carboxymethylcellulose, carboxymethylhydroxyethylcellulose, hydroxyethylcellulose, methylcellulose, ethylcellulose, ethylcarboxymethylcellulose, and hydroxypropylmethylcellulose.

Water-based fracturing fluids for fracturing conventional reservoirs or gravel packing applications are usually made viscous by the addition of about 20 pounds to about 70 pounds (lbs) of water-soluble polymer per 1,000 gallons (Mgal) of water (equivalent to about 2.4 g/L to about 8.4 g/L).

Crosslinking of Polysaccharide to Increase Viscosity of a Fluid or Form a Gel

The viscosity of a fluid at a given concentration of viscosity-increasing agent can be greatly increased by crosslinking the viscosity-increasing agent. A crosslinking agent, sometimes referred to as a crosslinker, can be used for this purpose. If crosslinked to a sufficient extent, the polysaccharide can form a gel with water. Gel formation is based on a number of factors including the particular polymer and concentration thereof, the particular crosslinker and concentration thereof, the degree of crosslinking, temperature, and a variety of other factors known to those of ordinary skill in the art.

A "base gel" is a fluid that includes a viscosity-increasing agent, such as guar, but that excludes crosslinking agents. Typically, a base gel is a fluid that is mixed with another fluid containing a crosslinker, wherein the mixed fluid is adapted to form a gel.

For example, one of the most common viscosity-increasing agents used in the oil and gas industry is guar. A mixture of guar dissolved in water forms a base gel, and a suitable crosslinking agent can be added to form a much more viscous fluid, which is then called a crosslinked fluid. The viscosity of base gels of guar is typically about 20 to about 50 cp. When a base gel is crosslinked, the viscosity is increased by 2 to 100 times depending on the temperature, the type of viscosity testing equipment and method, and the type of crosslinker used.

The degree of crosslinking depends on the type of viscosity-increasing polymer used, the type of crosslinker, concentrations, temperature of the fluid, etc. Shear is usually required to mix the base gel and the crosslinking agent. Thus, the actual number of crosslinks that are possible and that actually form also depends on the shear level of the system. The exact number of crosslink sites is not well known, but it could be as few as one to about ten per polymer molecule. The number of crosslinks is believed to significantly alter fluid viscosity.

For a polymeric viscosity-increasing agent, any crosslinking agent that is suitable for crosslinking the chosen monomers or polymers may be used.

Some crosslinking agents form substantially permanent crosslinks with viscosity-increasing polymer molecules. Such crosslinking agents include, for example, crosslinking agents comprising at least one metal ion that is capable of crosslinking gelling agent polymer molecules. Examples of such crosslinking agents include, but are not limited to, zirconium compounds (such as, for example, zirconium lactate, zirconium lactate triethanolamine, zirconium carbonate, zirconium acetylacetonate, zirconium maleate, zirconium citrate, zirconium oxychloride, and zirconium diisopropylamine lactate); titanium compounds (such as, for example, titanium lactate, titanium maleate, titanium citrate, titanium ammonium lactate, titanium triethanolamine, and titanium acetylacetonate); aluminum compounds (such as, for example, aluminum acetate, aluminum lactate, or aluminum citrate); antimony compounds; chromium compounds; iron compounds (such as, for example, iron chloride); copper compounds; zinc compounds; sodium aluminate; or a combination thereof. Suitable crosslinking agents also may include a crosslinking agent composition that may produce delayed crosslinking of an aqueous solution of a crosslinkable organic polymer, as described in U.S. Pat. No. 4,797,216, the entire disclosure of which is incorporated herein by reference. Suitable crosslinking agents also may include a crosslinking agent composition that may comprises a zirconium compound having a valence of +4, an alpha-hydroxy acid, and an amine compound as described in U.S. Pat. No. 4,460,751, the entire disclosure of which is incorporated herein by reference. The desired properties of the resulting fluid and how it interacts with the breakers or other additives that are being used may guide the choice of which crosslinking agent to use.

Some crosslinking agents do not form substantially permanent crosslinks, but rather chemically labile crosslinks with viscosity-increasing polymer molecules. One example of such a crosslinking agent is the borate ion for a water-soluble polysaccharide. For example, a guar-based gelling agent that has been crosslinked with a borate-based crosslinking agent does not form permanent cross-links.

Well Treatment—Gravel Packing

A solid particulate can be used for gravel packing operations. Gravel packing is commonly used as a sand-control method to prevent production of formation sand or other fines from a poorly consolidated subterranean formation. In this context, "fines" are tiny particles, typically having a diameter of 43 microns or smaller, that have a tendency to flow through the formation with the production of hydrocarbon. The fines have a tendency to plug small pore spaces in the formation and block the flow of oil. As all the hydrocarbon is flowing from a relatively large region around the wellbore toward a relatively small area around the wellbore, the fines have a tendency to become densely packed and screen out or plug the area immediately around the wellbore. Moreover, the fines are highly abrasive and can be damaging to pumping and other oilfield equipment and operations.

In gravel packing, a mechanical screen is placed in the wellbore and the surrounding annulus is packed with a particulate of a larger specific size designed to prevent the passage of formation sand or other fines. The larger particulate around the wellbore helps filter out the fine particles and prevents them from flowing into the well with the produced fluids. The primary objective is to stabilize the formation while causing minimal impairment to well productivity. It is also common, for example, to gravel pack after a fracturing procedure, and such a combined procedure is sometimes referred to as a "frac-packing."

The particulate used for this purpose is referred to as "gravel." In the oil and gas field, and as used herein, the term "gravel" is refers to relatively large particles in the sand size classification, that is, particles ranging in diameter from about 0.1 mm up to about 2 mm. Generally, a particulate having the properties, including chemical stability, of a low-strength proppant is used in gravel packing. An example of a commonly used gravel packing material is sand having an appropriate particulate size range.

Like with placing a proppant in a subterranean formation during hydraulic fracturing, in gravel packing a viscosified fluid can be used to help transport and place the gravel in the well.

Fluid Damage to Proppant Pack or Matrix Permeability

In well treatments using viscous well fluids, the material for increasing the viscosity of the fluid can damage the permeability of the proppant pack or the matrix of the subterranean formation. For example, a fracturing fluid can include a polymeric material that is deposited in the fracture or within the matrix. By way of another example, the fluid may include surfactants that leave unbroken micelles in the fracture or change the wettability of the formation in the region of the fracture.

Breakers are utilized in many treatments to mitigate fluid damage in the formation. However, breakers and other treatments are subject to variability of results, they add expense and complication to a fracture treatment, and it can still leave at least some fluid damage in the formation.

Breaker for Polysaccharide or Crosslinked Polysaccharide

After the proppant, gravel, or other particulate is mixed with the viscous treatment fluid and pumped downhole to place the particulate where desired, the fluid usually must be removed from the wellbore or the formation. For example, in the case of hydraulic fracturing, the fluid should be removed leaving the proppant in the fracture and without damaging the conductivity of the proppant bed. To accomplish this removal, the viscosity of the treatment fluid must be reduced to a very low viscosity, preferably near the viscosity of water, for optimal removal from the propped fracture. Similarly, when a viscosified fluid is used for gravel packing, the viscosified fluid must be removed from the gravel pack. Reducing the viscosity of a viscosified fluid is referred to as "breaking" the fluid. Chemicals used to reduce the viscosity of fracturing fluids are called breakers. Other types of viscosified well fluids also need to be broken for removal from the wellbore or subterranean formation.

No particular mechanism is necessarily implied by the term. For example, in the case of a crosslinked viscosity-increasing agent, for example, one way to diminish the viscosity is by breaking the crosslinks. For example, the borate crosslinks in a borate-crosslinked polymer can be broken by lowering the pH of the fluid. At a pH above 8, the borate ion exists and is available to crosslink and cause an increase in viscosity or gelling. At a lower pH, the borate ion reacts with proton and is not available for crosslinking, thus, an increase in viscosity due to borate crosslinking is reversible. In contrast, crosslinks formed by zirconium, titanium, antimony, and aluminum compounds, however, are considered to be non-reversible and are broken by other methods than controlling pH.

By way of another example, a breaker can reduce the molecular weight of a water-soluble polymer by cutting the long polymer chain. As the length of the polymer chain is cut, the viscosity of the fluid is reduced. For instance, reducing the guar polymer molecular weight to shorter chains having a molecular weight of about 10,000 converts the fluid to near water-thin viscosity. Thus, a single guar polymer needs to be cut into approximately 200 small pieces to substantially eliminate its viscosity increasing effects. This process can occur independently of any crosslinking bonds existing between polymer chains.

Thus, removal of the treatment fluid is facilitated by using breakers to reduce fluid viscosity.

Breakers must be selected to meet the needs of each situation. First, it is important to understand the general performance criteria of breakers. In reducing the viscosity of the fracturing fluid to a near water-thin state, the breaker must maintain a critical balance. Premature reduction of viscosity during the pumping of a fracturing treatment can jeopardize the treatment. Inadequate reduction of fluid viscosity after pumping can also reduce production if the required conductivity is not obtained.

In fracturing, for example, the ideal viscosity versus time profile would be if a fluid maintained 100% viscosity until the fracture closed on proppant and then immediately broke to a thin fluid. Some breaking inherently occurs during the 0.5 to 4 hours required to pump most fracturing treatments. One guideline for selecting an acceptable breaker design is that the fluid viscosity should be sufficient to carry the proppant throughout the entire pumping time. This guideline may be adjusted according to job time, desired fracture length, and required fluid viscosity at reservoir temperature.

Several methods of characterizing the rheology of fracturing fluids are available. Rheological test results can be used to select a breaker or breaker package that gives the desired viscosity during and after pumping. The following criteria should also be considered when selecting a breaker: breaker influence on proppant transport; breaker influence on fracture conductivity; and economic considerations.

Chemical breakers used to reduce viscosity of a fluid viscosified with a viscosifying polymer, such as guar and derivatized guar polymers, used in fracturing or other subterranean applications are generally grouped into three classes: oxidizers, enzymes, and acids. All of these materials reduce the viscosity of the fluid by breaking the polymer chain. The breakers operate by cleaving the backbone of polymer either by hydrolysis of acetal group, cleavage of glycosidic bonds, oxidative/reductive cleavage, free radical breakage or combination of these processes. A breaker should be selected based on its performance in the temperature, pH, time, and desired viscosity profile for each specific treatment.

Oxidizers commonly used to reduce viscosity of natural polymers includes, for example, sodium persulfate, potassium persulfate, ammonium persulfate, lithium or sodium hypochlorites, chlorites, peroxide sources (sodium perborate, sodium percarbonate, calcium percarbonate, urea-hydrogen peroxide, hydrogen peroxide, etc.), bromates, periodates, permanganates, etc. In these types of breakers, oxidation reduction chemical reactions occur as the polymer chain is broken.

A treatment fluid can optionally comprise an activator or a retarder to, among other things, optimize the break rate provided by a breaker. Examples of such activators include, but are not limited to, acid generating materials, chelated iron, copper, cobalt, and reducing sugars. Examples of retarders include sodium thiosulfate, methanol, and diethylenetriamine.

Problem of Thermal Instability Using Viscosified Treatment Fluids at High Temperatures Guars and derivatized guars are commonly used in fracturing fluids at temperatures up to 400° F. At high temperatures above about 350° F., however, maintaining a sufficient viscosity of such a fracturing fluid becomes difficult. Field requirements frequently demand increased stability of the fracturing fluids to be stable enough to carry proppant during the entire pumping stage. This can be a challenge especially at higher temperatures.

One conventional method to achieve high viscosity of a fracturing fluid is to increase the polymer loading, that is, the loading of the water-soluble polymeric viscosity-increasing agent. However, it is desirable to use as little polymer as possible in a fracturing fluid so that the overall cost of the fracturing job is lower, less polymer residue remains in a fracture of the formation and the proppant pack after breaking, and formation damage is minimized. Secondly, an important consideration for fracturing fluid selection is reducing the friction involved in pumping of the fluid, which lowers the pumping and treatment pressure requirements for a fracturing job. Hence, it is not advisable to increase the polymer loading as it may result in increased fluid friction and pumping pressure requirements.

Increasing crosslinker concentration can also lead to higher crosslinked viscosity and hence a stable fluid. However, higher crosslinker concentration leads to an over-crosslinked fluid, which is not desirable. This may be a disadvantage when fracturing fluids are prepared in base water containing high salt concentrations.

Incorporation of conventional thermal gel stabilizers (oxygen scavengers) has been used in an attempt to increase the stability of the fluid. Gel stabilizers work well up to a particular concentration, beyond which they do not impart much benefit. For example, increasing gel stabilizers by 10 pounds per thousand gallons (10 ppt) imparts a stability of approximately 15 minutes at a high temperature of 350° F. Even such seemingly small increases are significant when temperatures go beyond 300° F., and hence, most fracturing fluid recipes used at high temperatures incorporate gel stabilizers.

There is a long-felt need, however, to find practical and economical compositions and methods for stabilizing viscosified treatment fluids at high temperatures above about 350° F.

SUMMARY OF THE INVENTION

A method for treating a zone of subterranean formation is provided. The method includes the steps of: (a) forming a treatment fluid including: (i) water; (ii) a viscosity-increasing agent selected from the group consisting of water-soluble polysaccharides, water-soluble derivatives thereof, and any combination of the foregoing; (iii) a crosslinker for the viscosity-increasing agent; (iv) a hydrophobically modified water-soluble polymer; wherein the viscosity-increasing agent is not a hydrophobically modified polymer; and (b) introducing the treatment fluid into a zone of a subterranean formation, wherein the zone has a design temperature of equal to or greater than 350° F.

The method has particular application wherein the step of introducing the treatment fluid into the zone of the subterranean formation has a design temperature of equal to or greater than 350° F. The hydrophobically modified polymer increases the thermal stability of the treatment fluid at 350° F. compared to a similar fluid without the hydrophobically modified polymer. The methods and fluids according to the invention can extend the application of existing fracturing fluids to higher temperatures, which is a great advantage.

These and other aspects of the invention will be apparent to one skilled in the art upon reading the following detailed description. While the invention is susceptible to various modifications and alternative forms, specific embodiments thereof will be described in detail and shown by way of example. It should be understood, however, that it is not intended to limit the invention to the particular forms disclosed, but, on the contrary, the invention is to cover all modifications and alternatives falling within the spirit and scope of the invention as expressed in the appended claims.

BRIEF DESCRIPTION OF THE DRAWING

The accompanying drawing is incorporated into the specification to help illustrate examples according to the presently most-preferred embodiments.

FIG. 1 is a graph showing two control tests (without breaker) for a 50 lb/Mgal CMHPG fluid in 5% KCl, one without a hydrophobically modified polymer and the other with 2 gallons per thousand of an aqueous solution of the hydrophobically modified polymer. Temperature is raised from standard laboratory temperature and then maintained at 350° F. Viscosity is measured continuously.

FIG. 2 is a graph showing two control tests and two break tests for a 50 lb/Mgal CMHPG fluid in 5% KCl, wherein the tests are: (a) a control test without the hydrophobically modified polymer; (b) a break test with 0.1 gpt of a solution of sodium chlorite as breaker, which is an aqueous form of a strong oxidizer breaker, without the hydrophobically modified polymer; (c) a control test with 2 gpt of the hydrophobically modified polymer; and (d) a break test with 0.1 gpt solution of sodium chlorite breaker with 2 gpt of the aqueous solution of the hydrophobically modified polymer. Temperature is raised from standard laboratory temperature and then maintained at 350° F. Viscosity is measured continuously.

DETAILED DESCRIPTION OF PRESENTLY PREFERRED EMBODIMENTS AND BEST MODE

General Definitions and Usages

As used herein, the words "comprise," "have," "include," and all grammatical variations thereof are each intended to have an open, non-limiting meaning that does not exclude additional elements or steps.

As used herein, if not otherwise specifically stated, the physical state or phase of a substance (or mixture of substances) and other physical properties are determined at a temperature of 77° F. (25° C.) and a pressure of 1 atmosphere (Standard Laboratory Conditions).

As used herein, if not otherwise specifically stated, a substance is considered to be "soluble" in a liquid if at least 10 grams of the substance can be dissolved in one liter of the liquid when tested at 77° F. and 1 atmosphere pressure for 2 hours and considered to be "insoluble" if less soluble than this.

As will be appreciated by a person of skill in the art, the solubility of a substance in water can be dependent on the salinity, pH, or other substances in the water. Accordingly, the source, salinity, pH, and additive selection of the water can be modified to facilitate the dissolution of a substance in aqueous solution Unless otherwise specified, as used herein the apparent viscosity of a fluid (excluding any suspended solid particulate larger than silt) is measured with a Chandler Model 5550 type viscometer at a shear rate of 40/sec with a B2 bob and 440 Spring. For reference, the viscosity of pure water is about 1 cP.

As used herein, a substance is considered to be a fluid if it has an apparent viscosity less than 5,000 cP (independent of any gel characteristic) at the design temperature.

As used herein, a fluid is considered broken when the viscosity drops below 200 cP at the design temperature and the design shear.

In the oil industry, the term "gel" is used broadly to refer to a fluid viscosified with a thickening or gelling agent, regardless of whether it meets the technical definition for the physical state of a gel. As used herein, unless the context otherwise requires, a substance referred to as a "gel" is subsumed by the concept of "fluid" if it is a pumpable fluid.

As used herein the term "design temperature" refers to an estimate or measurement of the actual temperature at the down hole environment at the time of the treatment. That is, design temperature takes into account not only the bottom hole static temperature ("BHST"), but also the effect of the temperature of the treatment fluid on the BHST during treatment. Because treatment fluids may be considerably cooler than BHST, the difference between the two temperatures can be quite large. Ultimately, if left undisturbed, a subterranean formation will return to the BHST.

As used herein the term "design shear" refers to an estimate or measurement of the actual shear during the time of the treatment.

Unless otherwise specified, any ratio or percentage means by weight per volume.

As used herein, the phrase "by weight of the water" means the weight of the water of the continuous phase of the fluid without the weight of any proppant, viscosity-increasing agent, dissolved salt, or other materials or additives that may be present in the water.

Unless otherwise specified, any doubt regarding whether units are in U.S. or Imperial units, where there is any difference, U.S. units are intended herein. For example, "gal/Mgal" means U.S. gallons per thousand U.S. gallons.

Detailed Description

In general, a method for treating a zone of subterranean formation is provided. The method includes the steps of: (a) forming a treatment fluid including: (i) water; (ii) a viscosity-increasing agent selected from the group consisting of water-soluble polysaccharides, water-soluble derivatives thereof, and any combination of the foregoing; (iii) a crosslinker for the viscosity-increasing agent; (iv) a hydrophobically modified water-soluble polymer; wherein the viscosity-increasing agent is not a hydrophobically modified polymer; and (b) introducing the treatment fluid into a zone of a subterranean formation, wherein the treatment zone has a design temperature of equal to or greater than 350° F.

Water

The water use in the method can be selected from any convenient source. For example, the water can be selected from the group consisting of freshwater, seawater, brine, and any combination thereof.

Viscosity-Increasing Agent and Crosslinker

The viscosity-increasing agent is selected from the group consisting of water-soluble polysaccharides, water-soluble derivatives thereof, and any combination of the foregoing. More preferably, the viscosity-increasing agent is selected from the group consisting of guar, derivatized guar, and any combination thereof.

The crosslinker can be any convenient crosslinker for the viscosity-increasing agent. Preferably, the crosslinker is selected from the group consisting of metal crosslinkers, borate crosslinkers, and any combination thereof.

According to a preferred embodiment of the method, the viscosity-increasing agent and the crosslinker are each in at least a sufficient concentration such that a similar treatment fluid without the hydrophobically modified polymer would have a viscosity of at least 200 cP after 1 hour at 350° F.

Hydrophobically Modified Polymer

As used herein, a "hydrophobically modified water-soluble polymer" is based on a polymer that without the hydrophobic modification is or would be water soluble. As used herein, "hydrophobically modified" refers to the incorporation into the water-soluble (hydrophilic) polymer structure of hydrophobic groups, wherein the alkyl chain length is from about 4 to about 22 carbons. Preferably, the hydrophobically modified water-soluble polymer is water soluble.

The hydrophobically modified water-soluble polymers typically have a molecular weight in the range of from about 100,000 to about 10,000,000. In exemplary embodiments, the hydrophobically modified water-soluble polymers comprise a polymer backbone comprising polar heteroatoms. Generally, the polar heteroatoms present within a polymer backbone of the hydrophobically modified water-soluble polymer include, but are not limited to, oxygen, nitrogen, sulfur, or phosphorous.

In certain embodiments, the hydrophobically modified water-soluble polymers may be a reaction product of a hydrophilic polymer and a hydrophobic compound that are capable of reacting with each other. In exemplary embodiments, such hydrophobically modified water-soluble polymers are pre-reacted before they are placed into the subterranean formation.

The hydrophilic polymers suitable for forming the hydrophobically modified water-soluble polymers used in the present invention should be capable of reacting with hydrophobic compounds. Suitable hydrophilic polymers include, homo-, co-, or terpolymers such as, but not limited to, polyvinylamines, poly(vinylamines/vinyl alcohols), and alkyl acrylate polymers in general. Additional examples of alkyl acrylate polymers include, but are not limited to, polydimethylaminoethyl methacrylate, polydimethylaminopropyl methacrylamide, poly(acrylamide/dimethylaminoethyl methacrylate), poly(methacrylic acid/dimethylaminoethyl methacrylate), poly(2-acrylamido-2-methyl propane sulfonic acid/dimethylaminoethyl methacrylate), poly(acrylamide/dimethylaminopropyl methacrylamide), poly (acrylic acid/dimethylaminopropyl methacrylamide), and poly(methacrylic acid/dimethylaminopropyl methacrylamide).

In certain embodiments, the hydrophilic polymers contain reactive amino groups in the polymer backbone or as pendant groups, which are capable of reacting with hydrophobic compounds. In an exemplary embodiment, the hydrophilic polymers comprise dialkylamino pendant groups. In an exemplary embodiment, the hydrophilic polymers comprise a dimethylamino pendant group and at least one monomer comprising dimethylaminoethyl methacrylate or dimethylaminopropyl methacrylamide.

In certain exemplary embodiments, the hydrophilic polymers may comprise a polymer backbone comprising polar heteroatoms, wherein the polar heteroatoms present within a polymer backbone of the hydrophilic polymers include, but are not limited to, oxygen, nitrogen, sulfur, or phosphorous. Suitable hydrophilic polymers comprising polar heteroatoms within a polymer backbone include homo-, co-, or terpolymers such as, but not limited to, celluloses, chitosans, polyamides, polyetheramines, polyethyleneimines, polyhydroxyetheramines, polylysines, polysulfones, and starches. In an embodiment, the starch is a cationic starch. A suitable cationic starch may be formed by reacting a starch, such as corn, maize, waxy maize, potato, tapioca, and the like, with the reaction product of epichlorohydrin and trialkylamine.

The hydrophobic compounds that are capable of reacting with the hydrophilic polymers of the present invention include, but are not limited to, alkyl halides, sulfonates, sulfates, and organic acid derivatives. Examples of suitable organic acid derivatives include, but are not limited to, octenyl succinic acid; dodecenyl succinic acid; and anhydrides, esters, and amides of octenyl succinic acid or dodecenyl succinic acid. In certain exemplary embodiments, the suitable organic acid derivatives include, but are not limited to anhydrides, esters, and amides of octenyl succinic acid or dodecenyl succinic acid. In certain exemplary embodiments, the hydrophobic compounds may have an alkyl chain length of from about 4 to about 22 carbons. For example, where the hydrophobic compound is an alkyl halide, the reaction between the hydrophobic compound and hydrophilic polymer may result in the quaternization of at least some of the hydrophilic polymer amino groups with an alkyl halide, wherein the alkyl chain length is from about 4 to about 22 carbons.

In other exemplary embodiments, the hydrophobically modified water-soluble polymers used in the present invention may be prepared from the polymerization reaction of at least one hydrophilic monomer and at least one hydrophobically modified hydrophilic monomer. Examples of suitable methods of their preparation are described in U.S. Pat. No. 6,476,169, which is incorporated herein by reference in its entirety.

A variety of hydrophilic monomers may be used to form the hydrophobically modified water-soluble polymers useful in the present invention. Examples of suitable hydrophilic monomers include, but are not limited to homo-, co-, and terpolymers of acrylamide, 2-acrylamido-2-methyl propane sulfonic acid, N,N-dimethylacrylamide, vinyl pyrrolidone, dimethylaminoethyl methacrylate, acrylic acid, dimethylaminopropylmethacrylamide, vinyl amine, vinyl acetate, trimethylammoniumethyl methacrylate chloride, methacrylamide, hydroxyethyl acrylate, vinyl sulfonic acid, vinyl phosphonic acid, methacrylic acid, vinyl caprolactam, N-vinylformamide, N,N-diallylacetamide, dimethyldiallyl ammonium halide, itaconic acid, styrene sulfonic acid, methacrylamidoethyltrimethyl ammonium halide, quaternary salt derivatives of acrylamide, and quaternary salt derivatives of acrylic acid.

A variety of hydrophobically modified hydrophilic monomers also may be used to form the hydrophobically modified water-soluble polymers useful in the present invention. Examples of suitable hydrophobically modified hydrophilic monomers include, but are not limited to, alkyl acrylates, alkyl methacrylates, alkyl acrylamides, alkyl methacrylamides alkyl dimethylammoniumethyl methacrylate halides, and alkyl dimethylammoniumpropyl methacrylamide halides, wherein the alkyl groups have from about 4 to about 22 carbon atoms. In an exemplary embodiment, the hydrophobically modified hydrophilic monomer comprises octadecyldimethylammoniumethyl methacrylate bromide, hexadecyldimethylammoniumethyl methacrylate bromide, hexadecyldimethylammoniumpropylmethacrylamide bromide, 2-ethylhexyl methacrylate, or hexadecylmethacrylamide.

The hydrophobically modified water-soluble polymers formed from the above-described polymerization reaction may have estimated molecular weights in the range of from about 100,000 to about 10,000,000 and mole ratios of the hydrophilic monomer(s) to the hydrophobically modified hydrophilic monomer(s) in the range of from about 99.98: 0.02 to about 90:10. Suitable hydrophobically modified water-soluble polymers having molecular weights and mole ratios in the ranges set forth above include, but are not limited to, acrylamide/octadecyldimethylammoniumethyl methacrylate bromide copolymer, dimethylaminoethyl methacrylate/hexadecyldimethylammoniumethyl methacrylate bromide copolymer, dimethylaminoethyl methacrylate/vinyl pyrrolidone/hexadecyldimethylammoniumethyl methacrylate bromide terpolymer and acrylamide/2-acrylamido-2-methyl propane sulfonic acid/2-ethylhexyl methacrylate terpolymer.

Additional information regarding hydrophobically modified polymers is disclosed in U.S. Pat. No. 7,563,750 issued Jul. 21, 2009, having for named inventors Larry S. Eoff, Eldon Dwyann Dalrymple, and B. Raghava Reddy, which is incorporated herein by reference in its entirety.

Diversion by Hydrophobically Modified Polymer

Preferably, the hydrophobically modified water-soluble polymer is a "relative permeability modifier," which refers to a compound that is capable of reducing the permeability of a subterranean formation to aqueous-based fluids without substantially changing its permeability to hydrocarbons. Preferably, the relative permeability modifier is water soluble.

Among other things, the water-soluble relative permeability modifiers when placed into a subterranean zone may provide improved efficiency of injection operations by the diversion of aqueous injection fluids. It is believed that the water-soluble relative permeability modifier, among other things, may attach to surfaces within the subterranean formation. The presence of the water-soluble relative permeability modifier in the subterranean formation may reduce the permeability of the treated zones to aqueous-based fluids without substantially changing its permeability to hydrocarbons. By this modification of the permeability of the treated zones, it is believed that the water-soluble relative permeability modifier may, among other things, divert aqueous injection fluids injected into the formation during subsequent injection operations to other zones of the formation, e.g., from high permeability zones of the formation to less permeable zones.

If used as a relative permeability modifier, a sufficient concentrations of the hydrophobically modified polymer should be present in the treatment fluid to provide the desired level of diversion of aqueous injection fluids. In an exemplary embodiment, the water-soluble relative permeability modifier should be present in the permeability-modifying injection fluids of the present invention in an amount in the range of from about 0.02% to about 10% by weight of the permeability-modifying injection fluid. In an exemplary embodiment, the water-soluble relative permeability modifier should be present in the permeability-modifying injection fluids of the present invention in an amount in the range of from about 0.05% to about 1.0% by weight of the permeability-modifying injection fluid. In an exemplary embodiment of the present invention, the water-soluble relative permeability modifier may be provided in a concentrated aqueous solution prior to its combination with the aqueous injection fluid to form the permeability-modifying injection fluid.

Thermal Stabilizing by Hydrophobically Modified Polymer

In an embodiment, the hydrophobically modified polymer increases the thermal stability of the treatment fluid at 350° F. compared to a similar fluid without the hydrophobically modified polymer.

Preferably, the hydrophobically modified polymer is in at least a sufficient concentration to increase the thermal stability of the treatment fluid by at least one hour at 350° F. compared to a similar fluid without the hydrophobically modified polymer. More preferably, the hydrophobically modified polymer is in less than a sufficient concentration to increase the viscosity of the treatment fluid by more than two-fold measured after 1 hour at 350° F. compared to a similar fluid without the hydrophobically modified polymer.

The hydrophobically modified polymer need not be in a concentration that would itself function for the purpose of fully developing the viscosity of treatment fluid used in the method. Preferably, the hydrophobically modified polymer is in a concentration of less than 20% wt/vol of the water in the treatment fluid.

Inorganic Salt

The hydrophobically modified polymer is preferably not sensitive to inorganic salt in the water. Accordingly, in a preferred embodiment, the treatment fluid can include inorganic salt. It is not necessary to use freshwater. In an embodiment, the inorganic salt is selected from the group consisting of sodium chloride, potassium chloride, and any combination thereof. In an embodiment, the inorganic salt is in a concentration of at least 2% wt/vol. More preferably, the inorganic salt can be in a concentration of at least 5% wt/vol.

Breaker

The hydrophobically modified polymer preferably does not interfere with timely breaking of the treatment fluid. According to a preferred embodiment, the treatment fluid used in the method includes a breaker for the cross-linked viscosity-increasing agent. In an embodiment, the breaker includes a strong oxidizer. More preferably, the breaker is selected from the group consisting of: chlorite, persulfate, perborate, peroxide, and any combination thereof.

Oxygen Scavenger (Conventional Thermal Stabilizer)

In an embodiment, the treatment fluid preferably includes a conventional thermal stabilizer, which is an oxygen scavenger. Preferably, the oxygen scavenger comprises sodium or potassium thiosulfate.

Fracturing Fluid and Proppant

In an embodiment, the step of introducing the treatment fluid into a zone of a subterranean formation is at a pressure above the fracture pressure of the zone. The treatment fluid can optionally include a proppant.

Well Fluid Additives

It should be understood that a well fluid can contain other additives that are commonly used in oil field applications, as known to those skilled in the art. These include, but are not necessarily limited to, breaker aids, surfactants, alcohols, scale inhibitors, corrosion inhibitors, fluid-loss additives, oxidizers, consolidating agents, proppant flowback control agents, conductivity enhancing agents, and bactericides.

After Treatment, Flowing Back or Producing Hydrocarbon from Subterranean Formation In an embodiment, the methods include: after the step of introducing, flowing back fluid from the well. Preferably, after treatment, the methods include a step of producing hydrocarbon from the subterranean formation is the desirable objective.

EXAMPLES

This work describes a method to increase the thermal stability of a fracturing fluid by addition of a small amount of hydrophobically modified polymer in the treatment fluid. Preliminary testing conducted with and without the hydrophobically modified polymer confirms the increase in thermal stability by almost 1 hour at a high temperature of 350° F.

The preliminary test results were with a carboxymethyl hydroxylpropyl guar ("CMHPG") in 5% KCl, wherein the CMHPG is crosslinked with zirconium.

FIG. 1 is a graph showing two control tests (without breaker) for a 50 lb/Mgal CMHPG in 5% KCl with 0.3 gpt of an aqueous solution of a zirconium crosslinker, 2.25 gpt buffer of an aqueous solution of a carbonate, and 40 ppt of sodium thiosulfate as an oxygen scavenger, one without a hydrophobically modified polymer and the other with 2 gallons per thousand of an aqueous solution of a hydrophobically modified polymer. Temperature is raised from standard laboratory temperature and then maintained at 350° F. Viscosity is measured continuously. The test fluid without the hydrophobically modified polymer achieves a viscosity of 200 cP after 1 hr. 26 minutes. The test fluid with 2 gpt (0.2% vol/vol) of an aqueous solution of the hydrophobically modified polymer provides enhanced stability to the fluid, which does not drop to a viscosity of 200 cP until after 2 hours and 24 minutes. This confirms that the hydrophobically modified polymer provides an increased thermal stability of 1 hour at a temperature of 350° F.

FIG. 2 is a graph showing two control tests and two break tests for a 50 lb/Mgal CMHPG in 5% KCl with 0.3 gpt of an aqueous solution of a zirconium crosslinker, 2.25 gpt buffer of an aqueous solution of a carbonate, and 40 ppt of sodium thiosulfate as an oxygen scavenger, wherein the tests are: (a) a control test without the hydrophobically modified polymer; (b) a break test with 0.1 gpt aqueous solution of sodium chlorite as breaker, without the hydrophobically modified polymer; (c) a control test with 2 gpt of an aqueous solution of the hydrophobically modified polymer; and (d) a break test with 0.1 gpt of aqueous solution of sodium chlorite as breaker with 2 gpt of an aqueous solution of the hydrophobically modified polymer. Temperature is raised from standard laboratory temperature and then maintained at 350° F. Viscosity is measured continuously. In the presence of the breaker, the fluid without the hydrophobically modified polymer achieves 200 cP in 1 hour 10 minutes, while the fluid with the hydrophobically modified polymer achieves 200 cP viscosity after 2 hrs 10 minutes. This confirms that the additive imparts increased stability to the fracturing fluid at high temperatures, even in the presence of the breaker.

The examples demonstrate that a small concentration of a hydrophobically modified polymer causes a drastic increase in stability at high temperatures of about 350° F. In the example cited a stability of as much as 1 hr at a high temperature of 350° F. was obtained only with 0.2% (2 gallon per thousand gallons) of aqueous solution of the hydrophobically modified polymer. The use of such low amounts of the hydrophobically modified polymer makes it practical and attractive for field applications. Further, at lower temperatures even lower amounts may be required.

A hydrophobically modified polymer can change the permeability of the treated interval by adsorbing to the rock surfaces. The resulting change of the relative permeability of the rock to water and hydrocarbons thus reduces water flow from the treated area, with little or no damage to the flow of hydrocarbon. Additional information regarding hydrophobically modified polymers is disclosed in U.S. Pat. No. 7,563,750 issued Jul. 21, 2009, having for named inventors Larry S. Eoff, Eldon Dwyann Dalrymple, and B. Raghava Reddy, which is incorporated herein by reference in its entirety, and in U.S. Pat. No. 7,759,292 issued Jul. 20, 2010, having for named inventors Larry S. Eoff, Eldon D. Dalrymple, and B. Raghava Reddy, which is incorporated herein by reference in its entirety.

Unlike conventional polymers that leave residue to formation damage, use of the hydrophobically modified polymer in the fracturing fluid will be beneficial as any left behind in the formation will adsorb to the rock surfaces and prevent water production. Hence, the hydrophobically modified polymer can perform a dual role of increasing the thermal stability of the fracturing fluid during fracturing treatment and preventing water production after completion of the treatment. The hydrophobically modified polymer can also help provide leak-off control properties.

The hydrophobically modified polymer additive exhibits exceptional tolerance to high salt content and has been used in mixing water with salt concentrations as high as 22% KCl.

The tested fluids demonstrates effectiveness of the hydrophobically modified polymer as a thermal stabilizer in a high salt content of 5% KCl. Hence, the hydrophobically modified polymer can be used to prepare thermally stable fracturing fluids made with brines.

CONCLUSION

It should be appreciated that the various elements and steps as disclosed can be combined advantageously or practiced together in various combinations to increase the efficiency and benefits that can be obtained from the invention.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is, therefore, evident that the particular illustrative embodiments disclosed above may be altered or modified and all such variations are considered within the scope and spirit of the present invention. While compositions and methods are described in terms of "comprising," "containing," or "including" various components or steps, the compositions and methods also can "consist essentially of" or "consist of" the various components and steps. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a to b") disclosed herein is to be understood to set forth every number and range encompassed within the broader range of values. The invention illustratively disclosed herein suitably may be practiced in the absence of any element or step that is not specifically disclosed herein. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent(s) or other documents that may be incorporated herein by reference, the definitions that are consistent with this specification should be adopted.

What is claimed is:

1. A method for treating a zone of subterranean formation, the method comprising the steps of:
   (a) forming a treatment fluid comprising:
      (i) water;
      (ii) a viscosity-increasing agent selected from the group consisting of a carboxyalkyl derivative of guar, a carboxyalkyl derivative of cellulose, and any combination of the foregoing;
      (iii) a crosslinker for the viscosity-increasing agent;
      (iv) a hydrophobically modified water-soluble polymer, wherein the hydrophobically modified water-soluble polymer is: (a) a reaction product of a hydrophilic polymer and a hydrophobic compound; or (b) prepared from a polymerization reaction of at least one hydrophilic monomer and at least one hydrophobically modified hydrophilic monomer; and wherein the viscosity-increasing agent is not a hydrophobically modified polymer, and (b) introducing the treatment fluid into a zone of a subterranean formation, wherein the zone has a design temperature of equal to or greater than 350° F.

2. The method according to claim 1, wherein the crosslinker is selected from the group consisting of metal crosslinkers, borate crosslinkers, and any combination thereof.

3. The method according to claim 1, wherein the viscosity-increasing agent and the crosslinker are each in at least a sufficient concentration such that a similar treatment fluid without the hydrophobically modified polymer would have a viscosity of at least 200 cP after 1 hour at 350° F.

4. The method according to claim 1, wherein the hydrophobically modified water-soluble polymer comprises a polymer backbone comprising polar heteroatoms.

5. The method according to claim 1, wherein the hydrophobically modified water-soluble polymer has a molecular weight in the range of about 100,000 to about 10,000,000.

6. The method according to claim 1, wherein the hydrophobically modified water-soluble polymer is water soluble.

7. The method according to claim 1, wherein the hydrophilic polymer comprises at least one polymer selected from the group consisting of: a cellulose, a chitosan, a polyamide, a polyetheramine, a polyethyleneimine, a polyhydroxyetheramine, a polylysine, a polysulfone, and a starch.

8. The method according to claim 1, wherein the hydrophobic compound has an alkyl chain length of about 4 to about 22 carbons.

9. The method according to claim 1, wherein the mole ratio of the hydrophilic monomer to the hydrophobically modified hydrophilic monomer in the hydrophobically modified water-soluble polymer is in the range of about 99.98:0.02 to about 90:10.

10. The method according to claim 1, wherein the hydrophobically modified water-soluble polymer is a relative permeability modifier.

11. The method according to claim 1, wherein the hydrophobically modified polymer increases the thermal stability of the treatment fluid at 350° F. compared to a similar fluid without the hydrophobically modified polymer.

12. The method according to claim 1, wherein the hydrophobically modified polymer is in at least a sufficient concentration to increase the thermal stability of the treatment fluid by at least one hour at 350° F. compared to a similar fluid without the hydrophobic ally modified polymer.

13. The method according to claim 12, wherein the hydrophobically modified polymer is in less than a sufficient concentration to increase the viscosity of the treatment fluid by more than two-fold measured after 1 hour at 350° F. compared to a similar fluid without the hydrophobically modified polymer.

14. The method according to claim 12, wherein the hydrophobically modified polymer is in a concentration of less than 20% wt/vol of the water.

15. The method according to claim 1, wherein the treatment fluid comprises: inorganic salt.

16. The method according to claim 1, wherein the treatment fluid comprises: a breaker.

17. The method according to claim 1, wherein the treatment fluid comprises: an oxygen scavenger.

18. The method according to claim 17, wherein the oxygen scavenger comprises sodium thiosulfate.

19. The method according to claim 1, wherein step of introducing the treatment fluid into a zone of a subterranean formation is at a pressure above the fracture pressure of the zone.

20. The method according to claim 1, wherein the carboxyalkyl derivative of guar is selected from the group consisting of: carboxymethylguar, carboxymethylhydroxyethylguar, carboxymethylhydroxypropylguar, and ethylcarboxymethylguar, and any combination thereof.

21. The method according to claim 1, wherein the carboxyalkyl derivative of cellulose is selected from the group consisting of: carboxymethylcellulose, carboxymethylhydroxyethylcellulose, ethylcarboxymethylcellulose, and any combination thereof.

22. The method according to claim 1, wherein the hydrophilic polymer comprises at least one polymer selected from the group consisting of: a chitosan, a polyetheramine, a polyethyleneimine, a polyhydroxyetheramine, a polylysine, a polysulfone, and a starch.

* * * * *